United States Patent [19]
Jeske et al.

[11] Patent Number: 5,648,615
[45] Date of Patent: Jul. 15, 1997

[54] PRESSURE SENSOR PROVIDING IMPROVED CONNECTION TO A CIRCUIT BOARD

[75] Inventors: Rainer Jeske, Dettingen; Kurt Weiblen, Metzingen; Dieter Arand, Reutlingen, all of Germany

[73] Assignee: Robert Bosch GmbH, Stuttgart, Germany

[21] Appl. No.: 316,187

[22] Filed: Sep. 30, 1994

[30] Foreign Application Priority Data

Oct. 7, 1993 [DE] Germany ............... 43 34 123.3

[51] Int. Cl.⁶ ........................................... G01L 7/00
[52] U.S. Cl. ............................................... 73/756
[58] Field of Search ...................... 73/719, 720, 726, 73/727, 756

[56] References Cited

U.S. PATENT DOCUMENTS 4,772,217  9/1988  Petersen ........................... 73/756
4,879,903  11/1989  Ramsey et al. ..................... 73/756
5,101,665  4/1992  Mizuno ............................ 73/721

FOREIGN PATENT DOCUMENTS 41 11 539 A1  1/1992  Germany.

Primary Examiner—Richard Chilcot
Assistant Examiner—William L. Oen
Attorney, Agent, or Firm—Kenyon & Kenyon

[57] ABSTRACT

A pressure sensor for connection to a circuit board includes a silicon chip arranged in a housing so that one surface of the silicon chip faces the circuit board, and pressure is applied on the silicon chip surface facing away from the circuit board. The pressure sensor configuration is easy to produce and allows simple installation of the pressure sensor on the circuit board.

10 Claims, 3 Drawing Sheets

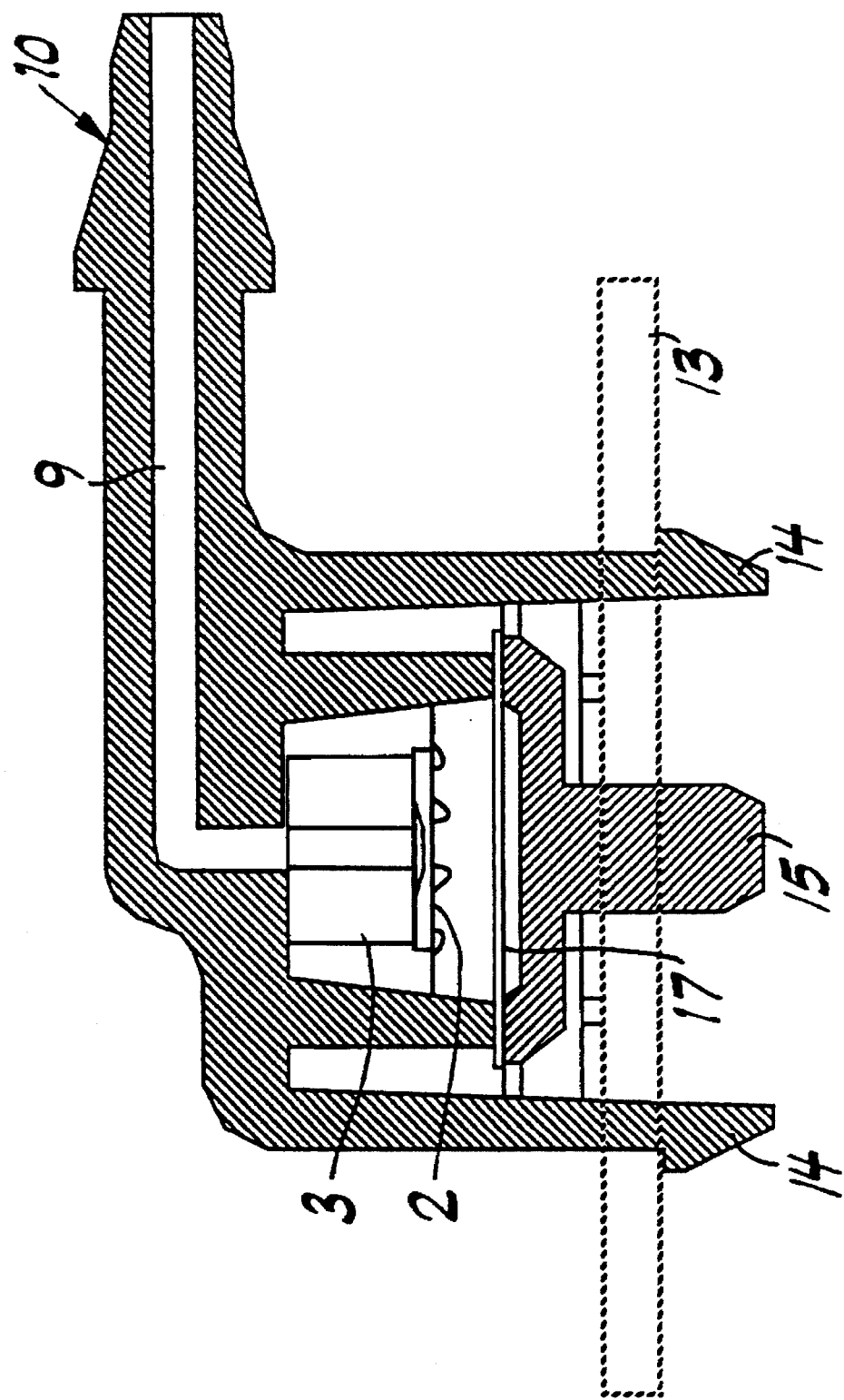

PRESSURE SENSOR PROVIDING IMPROVED CONNECTION TO A CIRCUIT BOARD

FIELD OF THE INVENTION

The present invention relates generally to a pressure sensor. More particularly, the present invention relates to a pressure sensor providing improved connection to a circuit board.

BACKGROUND OF THE INVENTION

German Patent Application No. DE 41 11 539 A1 describes a pressure sensor in which a silicon chip is mounted with its underside on a glass pedestal with an orifice. The membrane is arranged above the orifice so that the underside of the chip can be acted upon, via the orifice, by a pressure which deforms the membrane. Piezoelectric measuring elements used to analyze the deformation of the membrane are applied on the top side of the silicon chip. The orifice of the glass pedestal is aligned with the pressure inlet of the housing in which the chip is installed.

SUMMARY OF THE INVENTION

The pressure sensor according to the present invention has the advantage that it combines ease of manufacture with advantageous properties for the user of the sensor. The present invention is particularly advantageous for users in that they can install the pressure sensor on a circuit board like a standard component.

By orienting the chip of the pressure sensor with its top side facing the circuit board and the underside away from the circuit board, pressure can be introduced from the side facing away from the circuit board. For the user, this allows particularly simple installation of the pressure sensor on the circuit board, with no difficulty in conveying a pressure hose to the pressure sensor. Moreover, the pressure medium is conveyed from the underside of the silicon chip, which is particularly resistant to chemicals. Since the front side of the chip, on which the analysis means for the membrane are arranged, faces toward the circuit board, electrical connection means can be used with particular ease. The electrical connection means can be configured in the Surface Mounted Device (SMD) or Dual In-Line (DIL) arrangement that is commonly used for circuit boards.

The electrical connection means are configured, in particularly simple fashion, as metal inserts in the injection-molded housing and as bonded wires. Installation of the glass pedestal can be simplified by means of fitting corners in the housing. Two-part construction of the housing, which includes a base element and a cover, simplifies installation of the sensor chip in the housing. To simplify installation of the housing on the circuit board, circuit board hooks are provided to clip the housing in place. Centering pins or coding pins exclude the possibility of incorrect installation. The strength of the silicon chip is increased by applying a passivating layer to the top side. The housing can advantageously be vented by means of a water-repelling TEFLON® film.

BRIEF DESCRIPTION OF THE DRAWINGS

FIG. 5 shows a further exemplary embodiment of the pressure sensor according to the present invention.

DETAILED DESCRIPTION OF THE INVENTION

Figure 1:
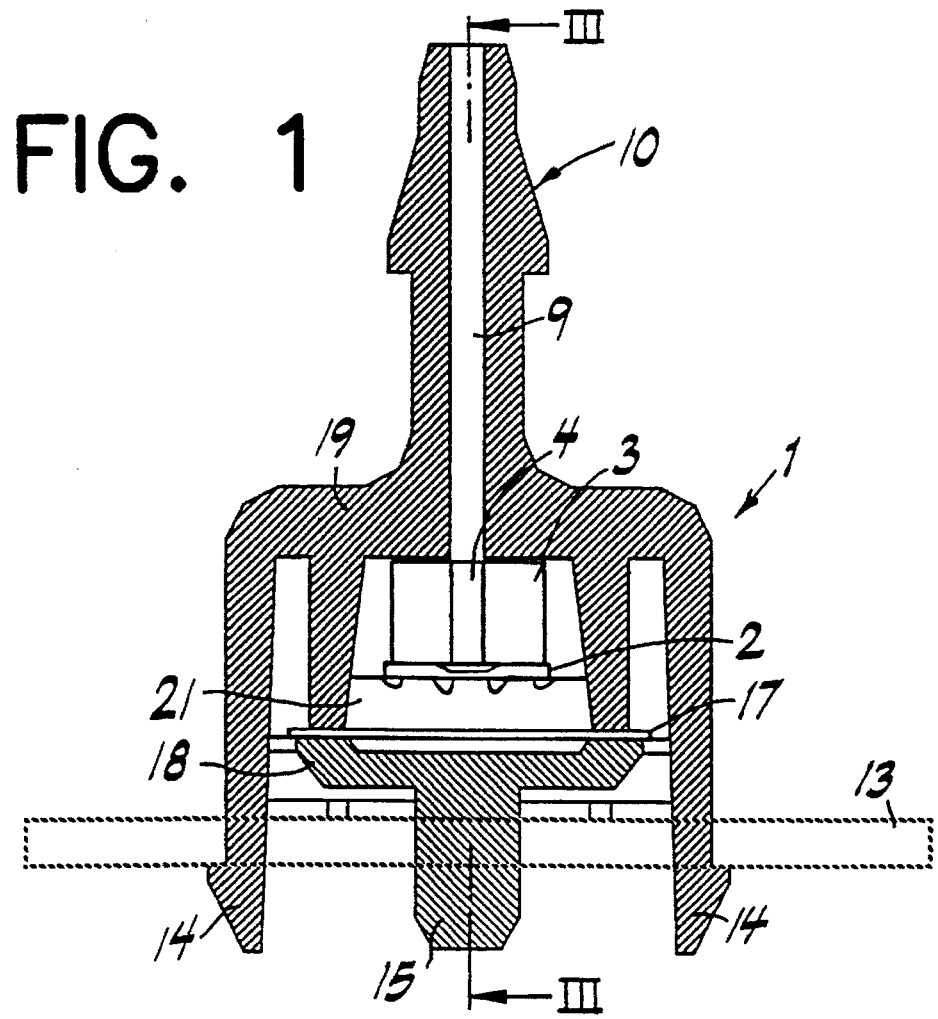
FIG. 1 shows a cross-sectional view of a pressure sensor according to the present invention.

FIG. 1 shows a pressure sensor comprising a housing 1 and a silicon chip 2 with a glass pedestal 3. Housing 1 includes a base element 19 and a cover 18. Base element 19 and cover 18 form a cavity 21 in which chip 2 is placed. Through a pressure inlet 9, a pressure can be introduced from the outside into the interior of cavity 21, which nevertheless is sealed with respect to pressure inlet 9 by silicon chip 2. Furthermore, the gas contained in cavity 21 can be exchanged through a TEFLON® film 17 and an orifice (not shown here) in cover 18. TEFLON® film 17 ensures, however, that no liquids can penetrate from the outside into cavity 21.

Housing 1 also includes circuit board hooks 14 for installation on circuit board 13. These hooks are pushed through openings in circuit board 13 and mechanically hook housing 1 into place in circuit board 13. A centering pin 15, serving as a mechanical guide for circuit board hooks 14, is also provided as an alignment aid during this insertion of housing 1 into circuit board 13. An asymmetrical configuration of the centering pin 15, or further asymmetrically arranged pins, can ensure that housing 1 will be inserted into circuit board 13 in only one position.

Figure 2:
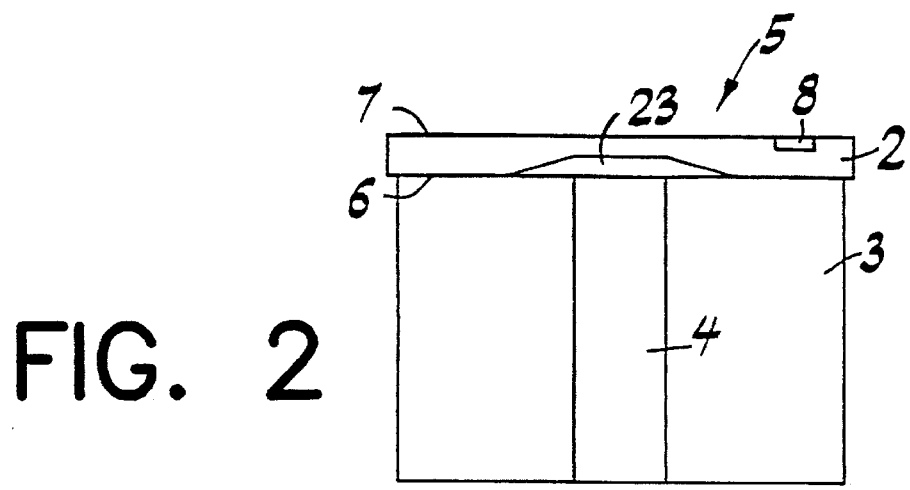
FIG. 2 shows a detailed view of a silicon chip and a glass pedestal of a pressure sensor according to the present invention.

FIG. 2 shows a cross-section view through silicon chip 2 and glass pedestal 3 in detail. Silicon chip 2 has a membrane 5 that closes off orifice 4 in glass pedestal 3. This arrangement guarantees that a pressure introduced through orifice 4 leads to deformation of membrane 5. For this purpose, silicon chip 2 is joined at its underside 6 to glass pedestal 3 in hermetically sealed fashion.

Analysis means 8, with which a deformation of membrane 5 can be detected, are arranged on the top side 7 of silicon chip 2. These analysis means can involve, for example, piezoresistive elements in the region of membrane 5, with which mechanical stresses in membrane 5 can be detected. Furthermore, processing of the membrane deformation signals can be performed directly on silicon chip 2 by analysis means 8. Silicon chips 2 of this kind are generally fabricated by producing semiconductor elements for analysis means on top side 7 with conventional methods. Membrane 5 is then formed by creating a recess 23 in underside 6.

The connection to glass pedestal 3 is generally made at underside 6, since no further structures are present on this side, and so therefore no chip surface needs to be kept free as a joining surface. In addition, the surface of silicon chip 2 facing orifice 4 is made exclusively of silicon. Silicon is particularly resistant to chemicals, thus making the chip resistant to any corrosive gases or liquids that may penetrate through the orifice.

As is evident from FIG. 1, glass pedestal 3 is set into base element 19 of housing 1 in such a way that orifice 4 is aligned with pressure inlet 9. Pressure inlet 9 is also provided with a connector fitting 10 which allows the user of the pressure sensor to connect a pressure inlet hose there. The pressure sensor can thus be arranged, for example in an engine control unit, on a circuit board 13 and connected by means of a pressure hose.

Figure 3:
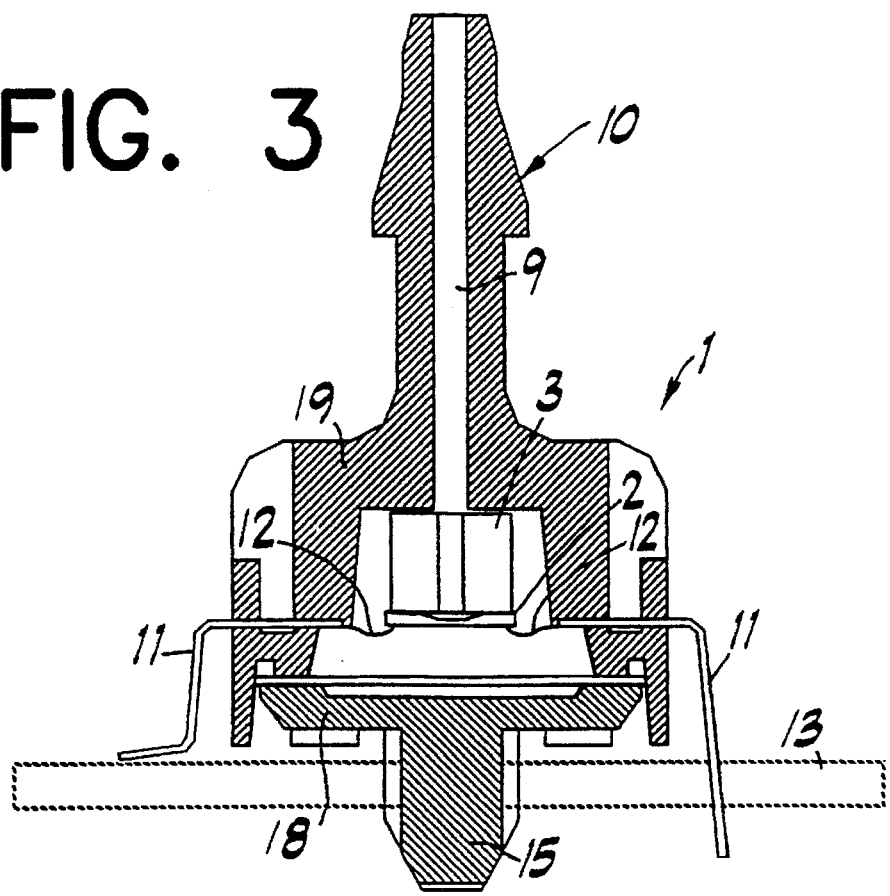
FIG. 3 shows a sectional view of the pressure sensor of the present invention illustrated in FIG. 1, along line III—III.

FIG. 3 shows a cross section through the pressure sensor according to the present invention, corresponding to the view along line III—III of FIG. 1. The parts known from FIG. 1 are again labeled with the same numbers. In contrast to FIG. 1, in FIG. 3, electrical connection means to make electrical contact between chip 2 and circuit board 13 are shown. These electrical connection means consist of bonded wires 12 and metal inserts 11.

Base element 19 is advantageously manufactured by plastic injection molding. In this injection molding process, metal inserts, which later serve as electrical connections from the inside of housing 1 (i.e. from cavity 21) to the outside of the housing or to circuit board 13, are injection-embedded into the wall of base element 19. Metal inserts 11 are configured in such a way that they can make contact with bonded wires 12.

Also provided on silicon chip 2 are connection regions for bonded wires 12, so that by means of the connection regions of chip 2, bonded wires 12 and metal inserts 11, analysis means 8 placed on the chip can be joined to circuit board 13. The connection between metal inserts 11 and circuit boards 13 can be made in two different ways. Metal inserts 11 can be bent so that they rest on the top side of circuit board 13 and can be soldered to conductor paths. It is also possible for metal inserts 11 to be configured in such a way that they can be pushed through holes in circuit board 13. In this case, soldering of metal inserts 11 to circuit board 13 can also occur on the side of circuit board 13 facing away from the pressure sensor.

The pressure sensor can thus be configured as an SMD (surface-mounted device), DIL (dual in-line), or SIL (single in-line) component, as are commonly used for installation on circuit boards 13. Any apparatus and machine that is in general use for the population and soldering of circuit boards can be used to install the pressure sensor on circuit board 13. The pressure sensor can therefore be mounted by a user on a circuit board 13 without additional outlay for installation equipment.

Figure 4:
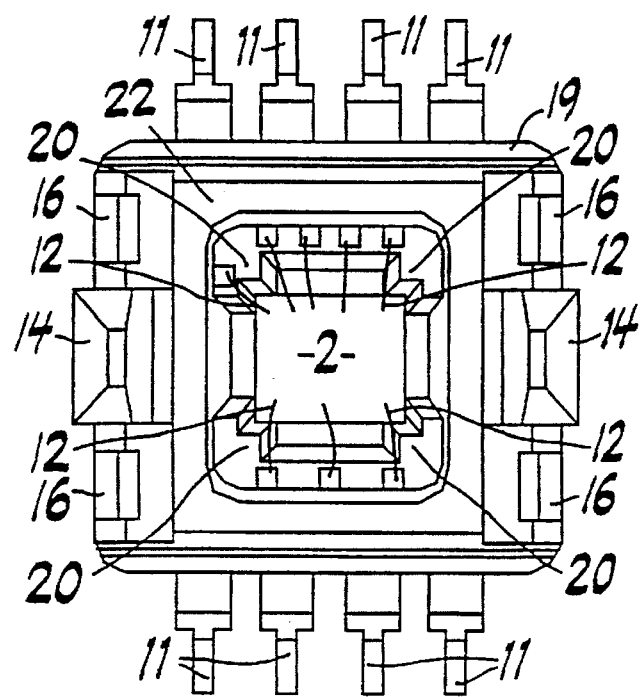
FIG. 4 shows a bottom view of the pressure sensor according to the present invention without a cover and without a circuit board.

FIG. 4 shows a bottom view of the pressure sensor according to the present invention illustrated in FIGS. 1 and 3, although circuit board 13 and cover 18 have been removed. Silicon chip 2, which is set in base element 19, is visible. Silicon chip 2 is first joined to glass pedestal 3. This is generally done by joining one silicon wafer to a plurality of silicon chips 2, and one glass wafer to a plurality of glass pedestals 3. Many individual silicon chips 2 on a glass pedestal 3 are then created by dividing up this wafer.

In order to facilitate alignment of orifice 4 with pressure inlet 9 when the composite of glass pedestal 3 and silicon chip 2 is put in place, fitting corners 20 are provided in base element 19, arranged so that orifice 4 and pressure inlet 9 are exactly aligned with one another. To facilitate insertion, these fitting corners 20 can be conical in shape. An adhesion edge 22, on which a TEFLON® film 17 is adhesively bonded, is also provided on the underside of base element 19. Cavity 21 is thus tightly sealed. Glass pedestal 3 or silicon chip 2 creates a pressure-tight seal with respect to pressure inlet 9. Although gas exchange with the environment can occur through TEFLON® film 17, liquids cannot penetrate. For the sake of simplification, silicon chip 2 is shown here without further structures on its surface.

Also evident here is a plan view of circuit board hooks 14, whose function and operation are already described from FIG. 1. Four further hooks 16 are also provided, serving to secure cover 18. These hooks 16 are flexible and make it possible to lock cover 18 in place by snapping cover hooks 16 into place on the side opposite base element 19. Since the actual sealed connection has already been made between TEFLON® film 17 and base element 19, this particularly simple sealing method can be used. Of course, it is also alternatively possible to fasten cover 18 with other means, for example adhesive bonding, welding, or bolting.

The pressure sensor shown in FIGS. 1 to 4 is particularly easy to manufacture. Base element 19 with metal inserts 11 can be manufactured in a known manner by injection molding. Adhesive bonding is then used to join glass pedestal 3, with silicon chip 2, to base element 19. Since the top side of silicon chip 2 is still freely accessible, at this stage the connection between silicon chip 2 and metal inserts 11 can be made in a known manner with a wire bonder. A passivating layer, for example a silicone gel, may be applied onto silicon chip 2. The housing is then sealed by applying a bead of adhesive onto adhesive edge 22, laying on the film, and setting cover 18 in place. All of these manufacturing steps are already known and tested in the art and can be automated. Manufacture of the pressure sensor is thus particularly simple.

The pressure sensor according to the present invention is also particularly suitable for installation on a circuit board 13. All the apparatus for connection to circuit board 13, such as circuit board hooks 14, centering pin 15, and metal inserts 11, are provided on one side of housing 1. Handling is therefore particularly simple for users of the pressure sensor according to the present invention, since they can simply install it onto the circuit boards like a standard SMD or DIL component. Furthermore, connector fitting 10 points away from the circuit board. As a result, the pressure sensor according to the present invention can be soldered without difficulty, since contamination of the pressure inlet is improbable.

The configuration of the pressure sensor according to the present invention—advantageous for both the manufacturer and the user—is made possible by the face-down installation of pressure sensor chip relative to the circuit board, i.e. the fact that chip 2 is oriented with its top side, on which analysis elements 8 are placed, oriented toward the circuit board. This configuration makes it possible to arrange all electrical connection means toward the circuit board (as viewed from the chip), while pressure can be introduced from the other side. Direct face-down installation of a pressure sensor chip 2 on a housing base is impossible, since it would produce mechanical stresses in the chip leading to falsification of the measurement signal. The function of glass pedestal 3 is specifically to attenuate such mechanical stresses.

FIG. 5 shows a further exemplary embodiment of the pressure sensor according to the present invention. Parts with the same function are again given the same reference numbers. In contrast to the exemplary embodiments of the present invention according to FIGS. 1 to 4, in FIG. 5, an arrangement of connector fitting 10 oriented parallel to circuit board 13 is provided. This feature reduces the overall height of the pressure sensor so it can be used even when space is restricted.

What is claimed is:

1. A pressure sensor for coupling to a circuit board, comprising:

a housing having at least one centering pin, the housing including a pressure inlet opening disposed therethrough and being adapted to be coupled to the circuit board, the at least one centering pin aligning the housing with the circuit board when the housing is connected to the circuit board;

a glass pedestal having a first end and a second end, the first end for coupling to the housing, the glass pedestal further having an orifice disposed therethrough, the orifice being aligned with the housing pressure inlet opening when the glass pedestal first end is coupled to the housing;

a silicon chip having a top side and an underside, the silicon chip top side facing toward the circuit board, the silicon chip underside facing away from the circuit board and being coupled to the glass pedestal second end;

a membrane formed on the silicon chip, the membrane being deformable by pressure introduced into the glass pedestal orifice, the membrane providing a pressure-tight seal with the glass pedestal orifice;

an analyzer, coupled to the silicon chip top side, for detecting deformation of the membrane; and an electrical connector, coupled to the housing, for electrically connecting the analyzer to the circuit board.

2. The pressure sensor according to claim 1, wherein the housing further includes at least one circuit board hook, a base element and a cover connected to the base element, the base element and the cover defining a cavity therebetween, the cavity enclosing the silicon chip, the at least one circuit board hook being guided by the at least one centering pin and connecting the housing to the circuit board.

3. The pressure sensor according to claim 1, further comprising a passivating layer disposed on the silicon chip top side.

4. The pressure sensor according to claim 2, wherein:

the base element has at least one wall and is formed by injection molding; and the electrical connector includes at least one metal insert embedded in the at least one wall of the base element and at least one bonded wire connected between the at least one metal insert and the silicon chip.

5. The pressure sensor according to claim 2, wherein the base element includes at least one fitting corner arranged for aligning the glass pedestal orifice with the housing pressure inlet when the glass pedestal is connected to the housing.

6. The pressure sensor according to claim 2, further comprising a TEFLON® film attached to the base element, thereby creating a pressure-tight seal and allowing venting of the cavity.

7. The pressure sensor according to claim 3, wherein the passivating layer includes a silicone gel.

8. A pressure sensor for coupling to a circuit board, comprising:

a housing having at least one centering pin, the housing including a pressure inlet opening disposed therethrough and being adapted to be coupled to the circuit board, the at least one centering pin aligning the housing with the circuit board when the housing is connected to the circuit board;

a glass pedestal having a first end and a second end, the first end for coupling to the housing, the glass pedestal further having an orifice disposed therethrough, the orifice being aligned with the housing pressure inlet opening when the glass pedestal first end is coupled to the housing;

a silicon chip having a top side and an underside, the silicon chip top side facing the circuit board, the silicon chip underside facing away from the circuit board and being attached to the glass pedestal second end;

a membrane formed on the silicon chip, the membrane being deformable by pressure introduced into the glass pedestal orifice, the membrane providing a pressure-tight seal with the glass pedestal orifice;

analysis means, coupled to the silicon chip top side, for detecting deformation of the membrane; and electrical connection means, coupled to the housing, for electrically connecting the analysis means to the circuit board.

9. The pressure sensor according to claim 1, wherein the at least one centering pin is asymmetrically arranged on the housing.

10. The pressure sensor according to claim 1, wherein the at least one centering pin includes two asymmetrically arranged centering pins.

* * * * *